United States Patent
Schiek et al.

(10) Patent No.: US 8,851,217 B2
(45) Date of Patent: Oct. 7, 2014

(54) METHOD FOR STARTING THE INTERNAL COMBUSTION ENGINE OF A HYBRID VEHICLE

(75) Inventors: Werner Schiek, Jettingen (DE); Thomas Rauner, Blaubeuren (DE); Immo Stache, Vaihingen/Enz (DE); Markus Goehring, Nufringen (DE); Leo Spiegel, Vaihingen/Enz (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 357 days.

(21) Appl. No.: 13/102,161

(22) Filed: May 6, 2011

(65) Prior Publication Data

US 2011/0304156 A1 Dec. 15, 2011

(30) Foreign Application Priority Data

Jun. 15, 2010 (DE) .................. 10 2010 017 374

(51) Int. Cl.
*B60W 10/00* (2006.01)
*B60W 20/00* (2006.01)
*B60W 10/06* (2006.01)
*B60W 10/04* (2006.01)
*B60W 10/08* (2006.01)
*F02D 29/02* (2006.01)
*F02N 11/08* (2006.01)
*B60W 30/192* (2012.01)
*B60K 6/26* (2007.10)

(52) U.S. Cl.
CPC ......... *F02N 11/0803* (2013.01); *Y02T 10/6286* (2013.01); *B60W 10/06* (2013.01); *B60W 10/08* (2013.01); *F02D 29/02* (2013.01); *B60W 20/00* (2013.01); *F02N 2300/2002* (2013.01); *B60W 2540/06* (2013.01); *B60K 2006/268* (2013.01); *B60W 20/40* (2013.01); *B60W 30/192* (2013.01)
USPC .............. 180/65.265; 180/65.275; 180/65.28; 180/65.285

(58) Field of Classification Search
USPC .............. 180/65.265, 65.275, 65.285, 65.21, 180/65.22, 65.225, 65.25, 65.31, 65.28; 290/38 R, 38 C, 38 E; 307/9.1, 10.1, 307/10.3, 10.6; 318/430; 477/3
See application file for complete search history.

(56) References Cited

U.S. PATENT DOCUMENTS 5,934,395 A * 8/1999 Koide et al. .............. 180/65.235
6,018,198 A   1/2000 Tsuzuki et al.
6,396,165 B1 * 5/2002 Nagano et al. ................ 307/10.6
6,476,573 B2 * 11/2002 Omata et al. ............... 180/65.26

(Continued)

FOREIGN PATENT DOCUMENTS

DE   198 38 853    3/1999
DE   699 22 603    11/2005

(Continued)

*Primary Examiner* — J. Allen Shriver, II
*Assistant Examiner* — James M Dolak
(74) *Attorney, Agent, or Firm* — Gerald E. Hespos; Michael J. Porco; Matthew T. Hespos

(57) ABSTRACT

A hybrid vehicle has an internal combustion engine, at least one electric drive motor and a starter. The internal combustion engine optionally can be started by the starter or the electric drive motor. However, the internal combustion engine is started by the starter when the vehicle is already being driven by the electric drive motor.

5 Claims, 1 Drawing Sheet

(56) References Cited

U.S. PATENT DOCUMENTS

| | | | |
|---|---|---|---|
| 6,492,741 B1* | 12/2002 | Morimoto et al. | 180/65.1 |
| 6,672,415 B1* | 1/2004 | Tabata | 180/65.25 |
| 7,243,010 B2* | 7/2007 | Tabata et al. | 701/22 |
| 7,503,413 B2* | 3/2009 | Jiang et al. | 180/65.28 |
| 7,823,668 B2* | 11/2010 | Ogata et al. | 180/65.265 |
| 7,835,842 B2 | 11/2010 | Unterforsthuber | |
| 7,921,945 B2* | 4/2011 | Harris | 180/65.285 |
| 7,980,340 B2* | 7/2011 | Luo et al. | 180/65.21 |
| 8,028,778 B2* | 10/2011 | Luo et al. | 180/65.22 |
| 8,083,015 B2* | 12/2011 | Kobayashi | 180/65.21 |
| 8,091,659 B2* | 1/2012 | Luo et al. | 180/65.22 |
| 8,177,004 B2* | 5/2012 | Shibata et al. | 180/65.235 |
| 8,610,297 B2* | 12/2013 | Biessenberger et al. | 290/38 R |
| 8,649,924 B2* | 2/2014 | Imaseki | 180/65.285 |
| 8,660,725 B2* | 2/2014 | Kawai et al. | 180/65.21 |
| 2003/0144773 A1* | 7/2003 | Sumitomo | 701/22 |
| 2007/0205031 A1 | 9/2007 | Ogata | |
| 2007/0215395 A1 | 9/2007 | Ogata | |
| 2008/0129049 A1* | 6/2008 | Sauvlet et al. | 180/65.2 |
| 2009/0112383 A1 | 4/2009 | Lenart et al. | |
| 2009/0171522 A1* | 7/2009 | Luo et al. | 701/22 |
| 2009/0287366 A1 | 11/2009 | Davis et al. | |

FOREIGN PATENT DOCUMENTS

| | | |
|---|---|---|
| DE | 10 2006 012 515 | 9/2007 |
| DE | 10 2007 009 528 | 9/2007 |
| DE | 10 2007 012 046 | 12/2007 |
| DE | 10 2007 061 895 | 6/2009 |
| EP | 1 489 294 | 12/2004 |
| FR | 2 928 122 | 9/2009 |

* cited by examiner

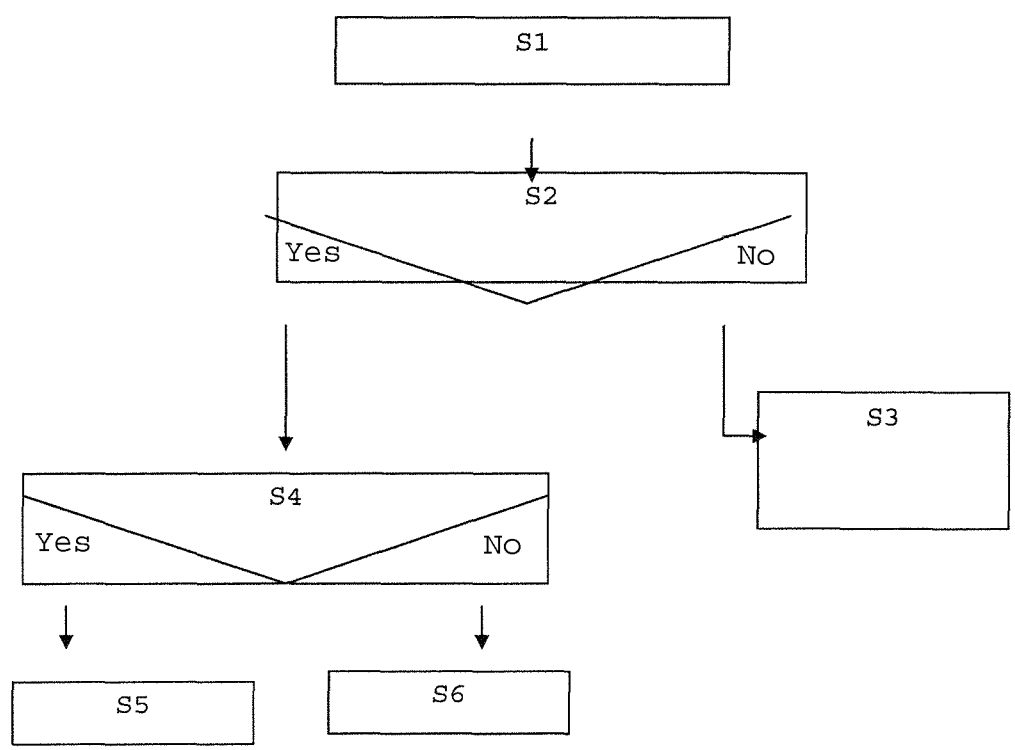

METHOD FOR STARTING THE INTERNAL COMBUSTION ENGINE OF A HYBRID VEHICLE

CROSS-REFERENCE TO RELATED APPLICATION

This application claims priority under 35 USC 119 to German Patent Application No. 10 2010 017 374.6, filed on Jun. 15, 2010, the entire disclosure of which is incorporated herein by reference.

BACKGROUND OF THE INVENTION

1. Field of the Invention

The invention relates to a method for starting the internal combustion engine of a hybrid vehicle and to a hybrid vehicle that controls the starting process of an internal combustion engine.

2. Description of the Related Art

Hybrid vehicles are generally understood to be a vehicle that is driven by at least one internal combustion engine and one or more electric drive motors. In this context, for example when the vehicle starts or at low velocities or accelerator pedal positions, the vehicle is driven solely by the electric drive motor, while at relatively high velocities or accelerator pedal positions the internal combustion engine assumes the driving of the hybrid vehicle together with the electric drive motor. It is also possible that the hybrid vehicle is moved solely by the internal combustion engine, for example if the battery provided for operating the electric drive motor no longer has any stored electrical energy.

These various types of drive make it necessary to start the internal combustion engine while the hybrid vehicle is travelling to assist the electric drive of the vehicle.

EP 1 489 294 A2 relates to a start/stop system having a motor generator and a separate control motor for starting an internal combustion engine. In this context, a temperature monitor is provided and re-starting the internal combustion engine by the starter is provided in a timed fashion to prevent overheating the motor generator.

DE 10 2007 012 046 A1 presents a hybrid vehicle with an electric motor and a separate starter for starting an internal combustion engine. An abnormality detector prevents the internal combustion engine from being started by the electric motor.

FR 2 928 122 proposes determining the optimum operating time of a hybrid drive train as a function of the position of the accelerator pedal.

US 2009/0112383 A1 discloses an electric vehicle in which the user can switch on a desired driving mode.

According to US 2009/0287366 A1, starting the internal combustion engine is prevented when an electric driving mode of a hybrid vehicle is selected manually.

The object of the invention is to improve the starting process of the internal combustion engine and to be able to make available a starting process that is more appropriate for the situation.

SUMMARY OF THE INVENTION

The invention relates to a method for operating a hybrid vehicle. The hybrid vehicle comprises an internal combustion engine, at least one electric drive motor and a starter. The internal combustion engine optionally can be started by the starter or the drive motor. The starting process of the internal combustion engine is carried out using the starter when the vehicle already is being driven by the electric drive motor.

An internal combustion engine is understood here to be an internal combustion engine provided for driving the hybrid vehicle. Such internal combustion engines are generally petrol-operated, diesel-operated or gas-operated internal combustion engines.

A starter is understood to be an electric motor that can drive the output shaft of the internal combustion engine. In particular, such a starter can be a pinion starter that is connected to the output shaft of the internal combustion engine using a pinion. Further possibilities are a belt starter or a belt starter-generator.

The internal combustion engine is arranged to be started either by the starter or by the electric drive motor. It now has been recognized that to start the internal combustion engine by the electric drive motor it is necessary to make available a torque that is not available for propelling or driving the vehicle during the starting process. To prevent the driving torque from decreasing while starting the internal combustion engine, a starter now can be used instead of the electric drive motor to start the internal combustion engine. As a result, the entire torque of the electric drive motor is available for driving the vehicle even during the starting process.

The vehicle can have an operator control element whose activation permits the internal combustion engine to be started by the starter. If the operator control element is not activated by the driver, the internal combustion engine preferably is moved solely by the electric drive motor to be able to be started. Therefore, the driver can decide whether the electric drive motor is to keep a torque in reserve to start the internal combustion engine or whether the starter is to be used for the starting process.

The operator control element also can be used to select an operating mode of the vehicle in which the vehicle is increasingly driven electrically. It is therefore possible during activation of the operator control element to assign a relatively large part of the operator control travel of the accelerator pedal to the drive by the electric motor. The driver preferably has to depress the accelerator pedal farther before the internal combustion engine is started.

The electric drive motor preferably is used for starting of the internal combustion engine when the vehicle is stationary. It is therefore possible to make available a more gentle starting behavior without risk of a loss of torque at the drive of the vehicle.

Whether the electric drive motor currently is being used to drive the vehicle preferably is determined on the basis of the energization of the electric drive motor.

The hybrid vehicle also preferably comprises a controller for controlling the starting process of the internal combustion engine. To start the internal combustion engine, the controller supplies the starter, for example a pinion starter or belt starter, with current if the electric drive motor already is being supplied with current for driving the hybrid vehicle.

In the text which follows, the invention will be described further by means of an exemplary embodiment and with the aid of the drawing.

BRIEF DESCRIPTION OF THE DRAWING

FIG. 1 shows a flowchart of a method for starting the internal combustion engine of a hybrid vehicle.

DETAILED DESCRIPTION OF THE PREFERRED EMBODIMENTS

A hybrid vehicle is a vehicle that has an electric drive and that can be driven by an internal combustion engine. The drive train of the hybrid vehicle has here the internal combustion engine, a starter, a clutch element, an electric drive motor and a transmission. The internal combustion engine can be a petrol engine or diesel engine. The starter assigned to the internal combustion engine is, for example, a pre-engaged drive starter that can be connected to the fly wheel of the internal combustion engine when necessary by means of a gearwheel and a free wheel.

The internal combustion engine also is connected to the electric drive motor by the clutch. The electric drive motor therefore has an input shaft connected to a clutch side, and an output shaft connected to gears via the transmission. The clutch is opened and the output shaft of the internal combustion engine is disconnected from the drive wheels if the vehicle is to be moved by the electric drive motor alone.

To start the internal combustion engine, a determination is made in a first step S1, shown in FIG. 1, whether a situation is present that appears to make it necessary to start the internal combustion engine. Such a situation can be present for a number of reasons. For example, the power of the electric motor or motors may not be sufficient to accelerate or move the vehicle along as desired. It also is possible that the electrical energy stored in the battery is not sufficient to operate the electric motor or motors as desired. Whether such a situation is present can be determined by a separate control unit.

The hybrid vehicle also has an operator control element, such as a push button key, a toggle switch, a rotary knob etc. with which the driver can influence the driving properties of the hybrid vehicle. Activation of the operator control element signals to a control element that the extended use of the electric drive motor is desired and the vehicle is driven solely electrically over a relatively large part of the activation travel of the accelerator pedal. The driving control also is influenced so that the vehicle is driven electrically and the internal combustion engine is not connected up until later, for example, at relatively high accelerations, relatively high rotational speeds of the electric drive motor and/or relatively high velocities.

If the internal combustion engine is to be started, a determination as to whether the operator control element has been activated is made in step S2. The internal combustion engine is started by the electric drive motor in step S3 if the operator control element has not been activated. For this purpose, the electric drive motor is connected to the output shaft of the internal combustion engine via the clutch and supplied with current.

If the operator control element has not been activated, step S4 determines whether the vehicle already is being driven by the electric motor. If this is the case, step S5 functionally connects the electric starter to the output shaft of the internal combustion engine by virtue of the fact that, for example, a pinion presses on the output shaft or the flywheel arranged thereon, and the starter therefore can move the output shaft of the internal combustion engine. If the vehicle is not being driven by the electric motor, the internal combustion engine continues to be started with the electric drive motor in step S6.

What is claimed is:

1. A method for operating a hybrid vehicle that has an internal combustion engine, at least one electric drive motor, a starter and a driver operable control that can be turned on to indicate a driver's preference for driving the vehicle by the electric drive motor, the method comprising:
   sensing conditions indicative of a need to start the internal combustion engine;
   sensing whether the hybrid vehicle already is being driven by the electric drive motor;
   determining whether the driver operable control has been turned on to indicate the driver's preference for driving the vehicle by the electric drive motor;
   starting the internal combustion engine by the electric drive motor in response to sensed conditions indicative of the need to start the internal combustion engine if the driver operable control has not been turned on;
   starting the internal combustion engine by the electric drive motor in response to the sensed conditions indicative of the need to start the internal combustion engine if the vehicle is not being driven by the electric drive motor and if the driver operable control has been turned on; and
   starting the internal combustion engine by the starter when in response to the sensed conditions indicative of the need to start the internal combustion engine if the vehicle already is being driven by the electric drive motor and if the driver operable control has been turned on.

2. The method of claim 1, wherein as a result of turning on the driver operable control, the internal combustion engine cannot be started until there is a predefined relatively high power level provided by the electric drive motor.

3. The method of claim 2, further comprising increasing an activation travel of an accelerator pedal that is assigned to travel solely by the electric drive motor if the driver operable control has been turned on.

4. The method of claim 1, wherein the step of sensing whether the hybrid vehicle already is being driven by the electric drive motor comprises determining whether the electric drive motor already is being supplied with current.

5. The method of claim 1, wherein the step of sensing conditions indicative of a need to start the internal combustion engine comprises determining whether power available from the electric drive motor is sufficient to move the vehicle in a manner specified by an accelerator pedal position and generating a signal to start the internal combustion engine upon determining that the power available from the electric drive motor is not sufficient to move the vehicle in the manner specified by the accelerator pedal position.

* * * * *